(12) United States Patent
Louchet-Pouillerie et al.

(10) Patent No.: US 8,455,103 B2
(45) Date of Patent: Jun. 4, 2013

(54) COMPOSITE MATERIAL COMPONENT WITH SILICON-CONTAINING CERAMIC MATRIX, PROTECTED AGAINST CORROSION

(75) Inventors: Caroline Louchet-Pouillerie, Arsac (FR); Eric Bouillon, Talence (FR); Henri Tawil, Le Bouscat (FR); Gérard Gueldry, Evry (FR); Rémi Bouvier, Merignac (FR)

(73) Assignee: SNECMA Propulsion Solide, Le Haillan (FR)

( * ) Notice: Subject to any disclaimer, the term of this patent is extended or adjusted under 35 U.S.C. 154(b) by 696 days.

(21) Appl. No.: 12/225,971

(22) PCT Filed: Apr. 3, 2007

(86) PCT No.: PCT/FR2007/051057
§ 371 (c)(1),
(2), (4) Date: Dec. 8, 2008

(87) PCT Pub. No.: WO2007/116176
PCT Pub. Date: Oct. 18, 2007

(65) Prior Publication Data
US 2009/0169873 A1 Jul. 2, 2009

(30) Foreign Application Priority Data

Apr. 4, 2006 (FR) ...................................... 06 51180

(51) Int. Cl.
*C04B 41/009* (2006.01)
*F01D 5/288* (2006.01)
*F01D 5/284* (2006.01)

(52) U.S. Cl.
USPC ........... 428/446; 428/448; 428/701; 428/702; 416/241 R; 416/214 B

(58) Field of Classification Search
USPC .............. 416/241 R; 428/446, 448, 701, 702
See application file for complete search history.

(56) References Cited

U.S. PATENT DOCUMENTS

| | | | | |
|---|---|---|---|---|
| 6,210,812 B1 * | 4/2001 | Hasz et al. | ................... | 428/621 |
| 6,682,820 B1 * | 1/2004 | Pujari | ........................... | 428/426 |
| 6,699,607 B1 * | 3/2004 | Spitsberg | ...................... | 428/702 |
| 6,733,908 B1 | 5/2004 | Lee et al. | | |
| 7,115,326 B2 * | 10/2006 | Spitsberg et al. | ............ | 428/697 |
| 2004/0151840 A1 | 8/2004 | Wang et al. | | |
| 2007/0243703 A1 * | 10/2007 | Pinnington et al. | .......... | 438/603 |

OTHER PUBLICATIONS

Lee, Kang N. Protective coating for gas turbines, 2006. (2006) http://www.netl.doe.gov/technologies/coalpower/turbines/refshelf/handbook/4.4.2.pdf http://www.netl.doe.gov/technologies/coalpower/turbines/refshelf/handbook/TableofContents.html.*

(Continued)

*Primary Examiner* — Callie Shosho
*Assistant Examiner* — Samir Shah
(74) *Attorney, Agent, or Firm* — Preti Flaherty Beliveau & Pachios LLP

(57) ABSTRACT

An environmental barrier is formed on a substrate (10) of ceramic matrix composite material and comprises an outer anticorrosion protection layer (12) containing a compound of the type comprising an aluminosilicate of an alkali, or an alkaline-earth, or a rare-earth element. A bond sub-layer (14) is formed between the substrate (10) and the protection layer (12), the composition of the bond sub-layer varying from substantially pure silicon to substantially pure mullite between an inner face beside the substrate and an outer face, with the silicon content decreasing and the mullite content increasing.

6 Claims, 4 Drawing Sheets

OTHER PUBLICATIONS

Hou, Ping et al., "Structure and high-temperature stability of compositionally graded CVD mullite coatings." International Journal of Refractory Metals & Hard Materials 19 (2001) 467-477, Elsevier Science Ltd.

Basu, S.N. et al., "Formation of mullite coatings on silicon-based ceramics by chemical vapor deposition." International Journal of Refractory Metals & Hard Materials 16 (1998) 343-352, Elsevier Science Ltd.

* cited by examiner

COMPOSITE MATERIAL COMPONENT WITH SILICON-CONTAINING CERAMIC MATRIX, PROTECTED AGAINST CORROSION

This application is a §371 national phase filing of PCT/FR2007/051057, filed Apr. 3, 2007, and claims priority to French Application 0651180, filed Apr. 4, 2006.

BACKGROUND OF THE INVENTION

The present invention relates to protection against corrosion for parts made of ceramic matrix composite (CMC) materials containing silicon, in particular CMC material parts having a matrix of silicon carbide (SiC). A particular but non-exclusive field of application for the invention is that of parts for the hot portions of gas turbines, such as the walls of combustion chambers, in particular for aeroengines.

For such gas turbines, the desire to improve efficiency and to reduce pollution emission leads to ever higher temperatures being envisaged in the combustion chamber.

Proposals have therefore been made to replace metal materials by CMC materials, in particular for the walls of combustion chambers. CMC materials are known for simultaneously presenting good mechanical properties enabling them to be used for structural elements, and for conserving these properties at high temperatures. CMC materials comprise fiber reinforcement made of refractory fibers, typically carbon fibers or ceramic fibers, which reinforcement is densified by a ceramic matrix, typically of SiC.

In the presence of a corrosive environment (oxidizing atmosphere, in particular in the presence of moisture and/or a saline atmosphere), a surface-retreat phenomenon is observed when using CMC materials having a an SiC matrix because the silica ($SiO_2$) that forms by oxidation at the surface of the CMC material becomes volatilized.

It has been recommended that an environmental barrier should be formed at the surface of the CMC material. FIG. 1 is a highly diagrammatic section view of such a prior art barrier for a substrate 1 of CMC material having an SiC matrix. The anticorrosion function is provided by a layer 2 of a compound of the type comprising an aluminosilicate of an alkaline-earth metal, such as the compound $BaO_{0.75}.SrO_{0.25}Al_2O_3(SiO_2)_2$ commonly referred to by the abbreviation BSAS. A chemical barrier layer 3 is interposed between the layer of BSAS and the substrate in order to avoid chemical interactions between the BSAS and the SiC of the substrate. Typically the layer 3 comprises an association of mullite (in the majority) and of BSAS, the presence of BSAS reducing sensitivity to cracking compared with a layer of mullite on its own. A sub-layer 4 of silicon (Si) is formed on the substrate to facilitate bonding the chemical barrier layer 3. Documents US 2004/0151840, U.S. Pat. Nos. 6,866,897, and 6,787,195, amongst others, illustrate that prior art.

Such an environmental barrier has been found to have shortcomings.

When temperature reaches high values, typically above about 1300° C., retreat of the surface of the BSAS layer can be observed due to volatilization of the silica contained in said layer. This can be remedied by increasing the thickness of the layer of BSAS so as to obtain the desired lifetime. Another solution consists in providing the environmental barrier with an outer layer for thermal protection, in particular a layer of yttrium-stabilized zirconia (or "yttrified zirconia"), as described for example in documents U.S. Pat. Nos. 6,740,364, 6,558,814, 6,699,607, 6,607,852, EP 1 416 066, and EP 1 142 850. In addition, at these high temperatures, deterioration occurs by chemical interaction between the BSAS contained in the chemical barrier layer and the Si in the bond sub-layer on the substrate. To remedy that, a layer of mullite on its own can be interposed between the bond sub-layer made of Si and the chemical barrier layer made of mullite+BSAS, as described in particular in documents U.S. Pat. Nos. 6,759,151 and 6,733,908.

The Applicant has also observed that the chemical bond layer of Si is sensitive to the cracking that is caused by thermal shocks, which can lead to loss of cohesion of the environmental barrier.

The formation of a coating of mullite with a composition gradient on a substrate containing silicon, in particular a substrate of SiC is described in an article by Basu et al. "Formation of mullite coatings on silicon-based ceramics by chemical vapor deposition", and in an article by Hou et al. "Structure and high temperature stability of compositionally graded CVD mullite coatings" published in "International Journal of Refractory Metals and Hard Metals", Elsevier Publishers, Barking, GB, respectively in Vol. 16, No. 4-6, 1998, pp. 343-352, and Vol. 19, No. 4-6, July 2001, pp. 467-477. The mullite coating is formed by chemical vapor deposition (CVD). The composition of the coating varies from a phase that is rich in silica close to the substrate, to a phase that is rich in alumina close to the outer surface, the alumina-rich phase performing the anticorrosion function.

OBJECT AND SUMMARY OF THE INVENTION

An object of the invention is to provide parts formed of a substrate made of a CMC material containing silicon, and that can be used in durable manner in a corrosive atmosphere and at high temperatures that may exceed 1300° C.

This object is achieved by a part comprising a substrate of ceramic matrix composite material containing silicon, and an environmental barrier formed on the substrate and comprising an outer anticorrosion protection layer containing a compound of the type comprising an aluminosilicate of an alkali, or an alkaline-earth, or a rare-earth element, and a bond sub-layer containing silicon and formed on the substrate, in which part, a bond sub-layer is formed between the substrate and the anticorrosion protection layer, the composition of the bond sub-layer varying from substantially pure silicon to substantially pure mullite between an inner face beside the substrate and an outer face, with the silicon content decreasing and the mullite content increasing.

The term "substantially pure mullite" is naturally used herein to mean mullite that is substantially stoichiometric ($3Al_2O_3$-$2SiO_2$).

Because of its varying composition, such a bond sub-layer is relatively insensitive to cracking, in particular cracking due to thermal shocks. It also performs the function of providing chemical bonding on the substrate via its inner face that is made of silicon, and the function of providing a chemical barrier by means of its outer face that is made of mullite, the anticorrosion function being provided by the outside layer formed on the mullite outer face of the sub-layer.

In order to provide a better guarantee of no chemical interaction between the Si of the bond sub-layer and one or more of the compounds contained in an environmental barrier layer on the bond sub-layer, the bond sub-layer may terminate beside its outer face in a thin layer of substantially pure mullite, preferably occupying a thickness of no more than 50 micrometers (µm).

Beside its inner face, the bond sub-layer may begin with a thin layer of substantially pure silicon formed on the substrate. Such a thin layer encourages chemical bonding on the substrate without there being any need for it to be very thick. This thickness is preferably less than 50 µm, which in association with the composition gradient of the bond sub-layer serves to minimize any risk of cracking under the effect of thermal stresses.

In known manner, it is possible to associate the environmental barrier with a thermal protection barrier formed on the outer anticorrosion protection layer.

Furthermore, the environmental barrier may include an anticorrosion protection layer formed by a compound of the type comprising an aluminosilicate of an alkali, or an alkaline-earth, or a rare-earth element, and an underlying layer formed above the bond sub-layer and comprising an association of said compound together with mullite. The underlying layer may have a composition that varies between substantially pure mullite in the vicinity of an inner face situated beside the bond sub-layer, and substantially only the compound forming the anticorrosion protection layer in the vicinity of an outer layer situated beside said anticorrosion protection layer, with decreasing content of mullite and increasing content of said compound.

Advantageously, a part in accordance with the invention constitutes a component for a hot portion of a gas turbine, in particular of an aeroengine, such as a portion of the wall of a combustion chamber.

BRIEF DESCRIPTION OF THE DRAWINGS

Other features and advantages of the invention appear on reading the following description given by way of non-limiting indication. Reference is made to the accompanying drawings, in which.

DETAILED DESCRIPTION OF EMBODIMENTS

Figure 2:
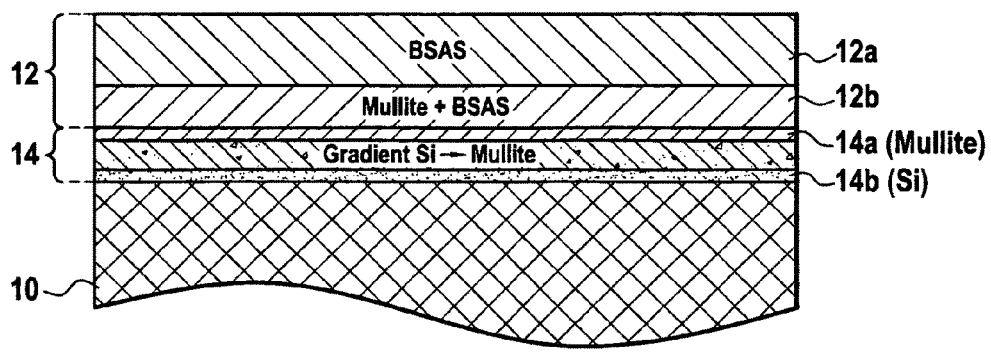
FIG. 2 is a highly diagrammatic section view of an embodiment of a part according to the invention having an environmental barrier formed on a substrate of CMC material containing silicon.

FIG. 2 is a highly diagrammatic view of a substrate 10 provided with an environmental barrier constituting an embodiment of the present invention.

The substrate 10 is of CMC material containing silicon. The fiber reinforcement of the CMC material may be carbon fibers (C) or ceramic fibers, in particular SiC fibers. The matrix of the CMC material is constituted by a compound of Si, in particular SiC or a ternary Si—B—C system, either throughout, or at least in part in an outer matrix phase. The term outer matrix phase is used to mean a matrix phase that is formed last, furthest away from the fibers of the reinforcement. Under such circumstances, the matrix may be made up of a plurality of phases of different kinds, for example:

a mixed C—SiC matrix (with SiC on the outside); or a sequenced matrix having alternating SiC phases and matrix phases of lower stiffness, e.g. of pyrolytic carbon (PyC), boron nitride (BN), or boron-doped carbon (BC), with a terminal stage of the matrix being made of SiC; or a self-healing matrix having matrix phases of boron carbide ($B_4C$) or of a ternary Si—B—C system, possibly including free carbon ($B_4C$+C, Si—B—C+C), together with a terminal phase of Si—B—C or of SiC.

Such CMC materials are described in particular in documents U.S. Pat. Nos. 5,246,736, 5,965,266, 6,291,058, and 6,068,930.

The environmental barrier comprises an anticorrosion protection layer 12 and a bond sub-layer 14 between the substrate 10 and the layer 12.

The anticorrosion protection layer 12 comprises an outer layer 12a made of a compound of the type comprising an aluminosilicate of an alkali, or an alkaline-earth, or a rare-earth element, such as BSAS. Other compounds could be envisaged, such as:

$CaO.Al_2O_3.(SiO_2)_2$ or CAS;

$(MgO)_2.(Al_2O_3)_2.(SiO_2)_5$ or MAS;

$BaO.Al_2O_3.SiO_2$ or BAS;

$SrO.Al_2O_3.SiO_2$ or SAS;

$35BaO.15CaO.5Al_2O_3.10B_2O_3.35SiO_2$ or BCAS;

or also aluminosilicates of elements selected from rare earths, designated herein generically as "aluminosilicate type compounds of an alkali, or an alkaline-earth, or a rare-earth element".

The anticorrosion protection layer includes an inner layer 12b forming a chemical barrier and constituted by a mixture of mullite and of the compound constituting the layer 12a, in this example mullite+BSAS. Mullite is in the majority and by weight it preferably represents between 50% and 100%, and preferably about 80%.

The bond sub-layer 14 is of a composition that varies from practically pure Si beside the substrate to almost pure mullite (or practically stoichiometric mullite $3Al_2O_3$-$2SiO_2$) beside the anticorrosion protection layer. The variation in the composition may take place substantially continuously, or else in steps. Advantageously, the bond sub-layer is terminated by a thin layer 14a of practically pure mullite. This layer 14a is of limited thickness, preferably having thickness of no more than 50 µm. Beside the substrate 10, the bond sub-layer may begin with a thin layer 14b of practically pure Si encouraging chemical bonding on the substrate. The layer 14b is of limited thickness, preferably having thickness of no more than 50 µm. This limited thickness, together with the composition gradient of the sub-layer 14 serves to limit the risk of cracking.

The mullite layer 14a constitutes a chemical reaction barrier between the BSAS type compound of the anticorrosion protection layer 12 and the Si of the bond layer 14.

Figure 3:
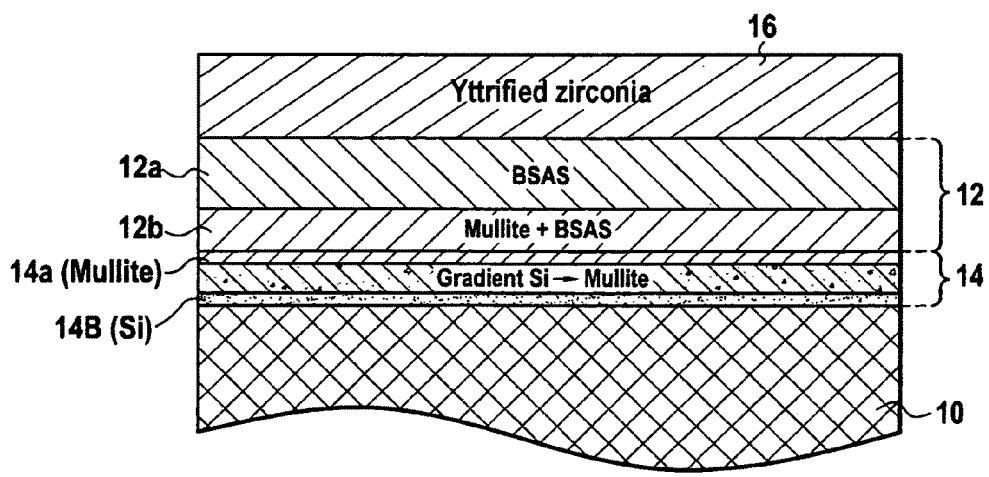
FIGS. 3 to 5 are section views showing variant embodiments of the environmental barrier of FIG. 2.
Figure 4:
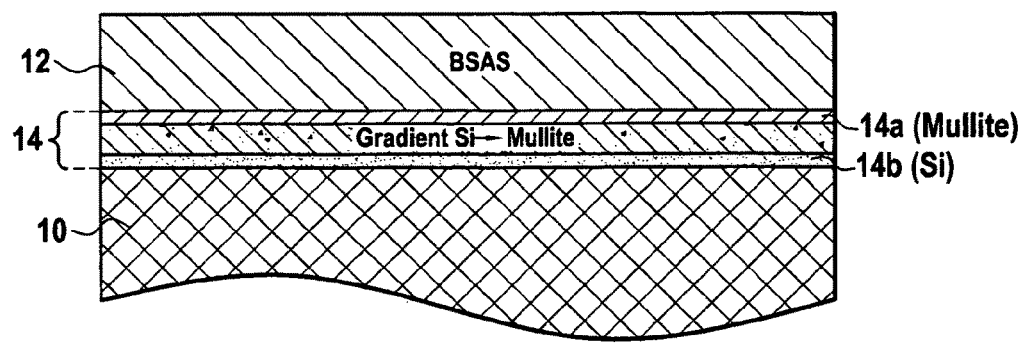
Figure 5:
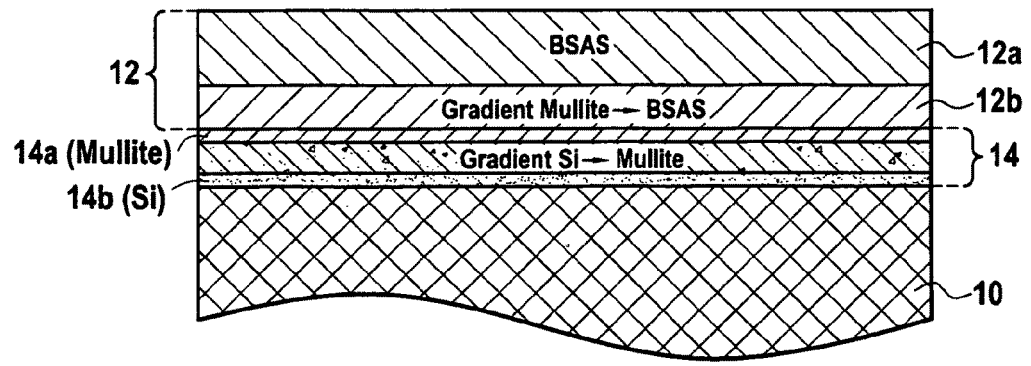

Variant embodiments are shown in FIGS. 3 to 5. Elements that are the same amongst the embodiments of FIGS. 2 to 5 are given the same reference numerals.

In FIG. 3, the anticorrosion protection layer 12 is, in known manner, surmounted by a thermal barrier layer 16, e.g. of yttrium-modified zirconia (or "yttrified zirconia").

In FIG. 4, the anticorrosion protection layer 12 is limited to a layer of a compound of the aluminosilicate type of an alkali, or an alkaline-earth, or a rare-earth element, e.g. a layer of BSAS, the final mullite layer 14a of the bond sub-layer forming a chemical barrier against Si.

In FIG. 5, the inner layer 12b of the anticorrosion protection layer 12 has a composition that varies from practically pure mullite beside the bond sub-layer, to BSAS or some other similar compound that is practically pure beside the outer layer 12a, such a layer 12b with a composition gradient providing improved ability to withstand thermal stresses.

The various layers of the environmental barrier can be deposited by physical vapor deposition, e.g. by plasma spraying, or thermal plasma spraying, in air at atmospheric pressure or in a vacuum. A composition gradient layer is then formed using in succession sources of different compositions or by activating in alternation and for varying durations two sources of ingredients for the composition that is to be deposited. Thus, particularly for mullite, it is possible to use the chemical vapor deposition (CVD) process, possibly in its plasma-enhanced form (PE-CVD). It is also possible to envisage deposition using powders in suspension in a liquid.

The advantage of having a bond sub-layer with a composition gradient present between Si and mullite, in terms of ability to withstand thermal shocks, can be understood from the following examples.

EXAMPLE 1

An environmental barrier in accordance with the invention, of the type shown in FIG. 2, was formed on substrates of composite material made up of fiber reinforcement using SiC fibers produced by the Japanese supplier Nippon Carbon under the reference "Hi-Nicalon", and a $B_4C+C$, SiC, Si—B—C+C sequenced self-healing matrix obtained by chemical vapor infiltration after depositing an interphase layer of PyC on the fibers.

A thermal plasma spraying deposition technique was used.

The bond sub-layer (14) having a composition gradient going from Si to mullite was generated under low pressure using two powder containers, one for silicon powder and the other for mullite powder. Deposition conditions were adjusted so as to form a layer (14b) of pure Si having a thickness of 30 µm, followed by a layer of Si+mullite having a thickness of 70 µm with the proportion of mullite increasing progressively, and followed by a layer (14a) of pure mullite having a thickness of 30 µm.

The anticorrosion protection layer (12) was produced under atmospheric pressure. An inner layer (12b) having thickness of 100 µm was obtained from a mixture of mullite and BSAS powders at a mass ratio of 80 to 20, and an outer layer of BSAS (12a) having a thickness of 170 µm was obtained using the BSAS powder.

EXAMPLE 2

Comparative

Figure 1:
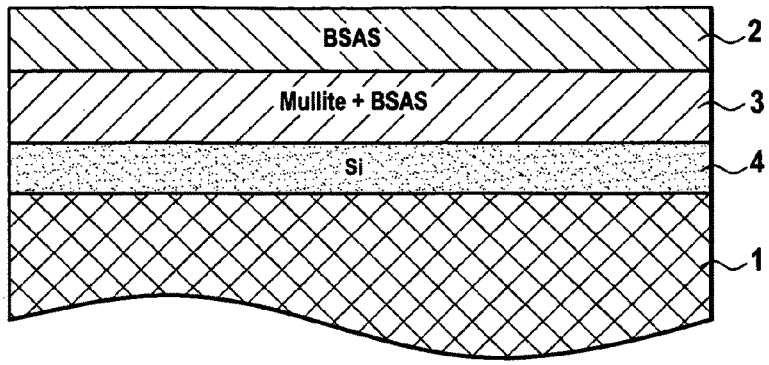
FIG. 1 is a highly diagrammatic section view of a prior art environmental barrier formed on a substrate of CMC material with an SiC matrix.

An environmental barrier of the prior art and shown in FIG. 1 was formed on a substrate of the same composite material as was used in Example 1.

A thermal plasma spraying deposition technique was used as in Example 1.

A bond sub-layer (4) of pure Si having thickness of 120 µm and a barrier layer (3) of pure mullite having thickness of 170 µm were made under low pressure using silicon and mullite powders.

An anticorrosion protection layer (2) of BSAS with thickness of 150 µm was then produced under atmospheric pressure with a plasma gas formed by a mixture of argon and helium, using the BSAS powder.

Test 1

Substrates coated in barriers obtained in application of Examples 1 and 2 were subjected to thermal shock testing by being placed in an oven heated to 1200° C. for 2 minutes and then returned to air at ambient temperature.

Figure 6:
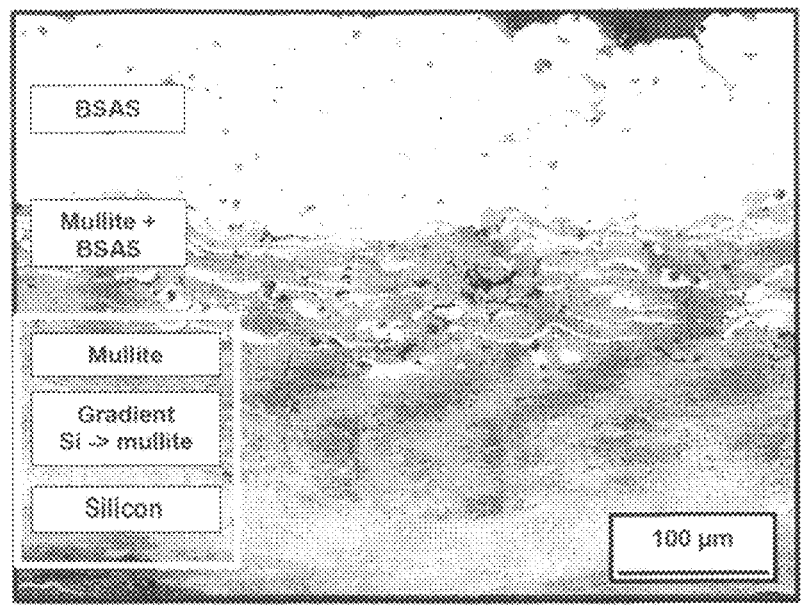
FIGS. 6 and 7 are two scanning electron microscope views of a section of an environmental barrier made in accordance with the invention and of a prior art environmental barrier, after being exposed to thermal shocks.

After two such thermal shocks, no cracking was observed in the bond sub-layer obtained in Example 1, as can be seen the section view of FIG. 6.

Figure 7:
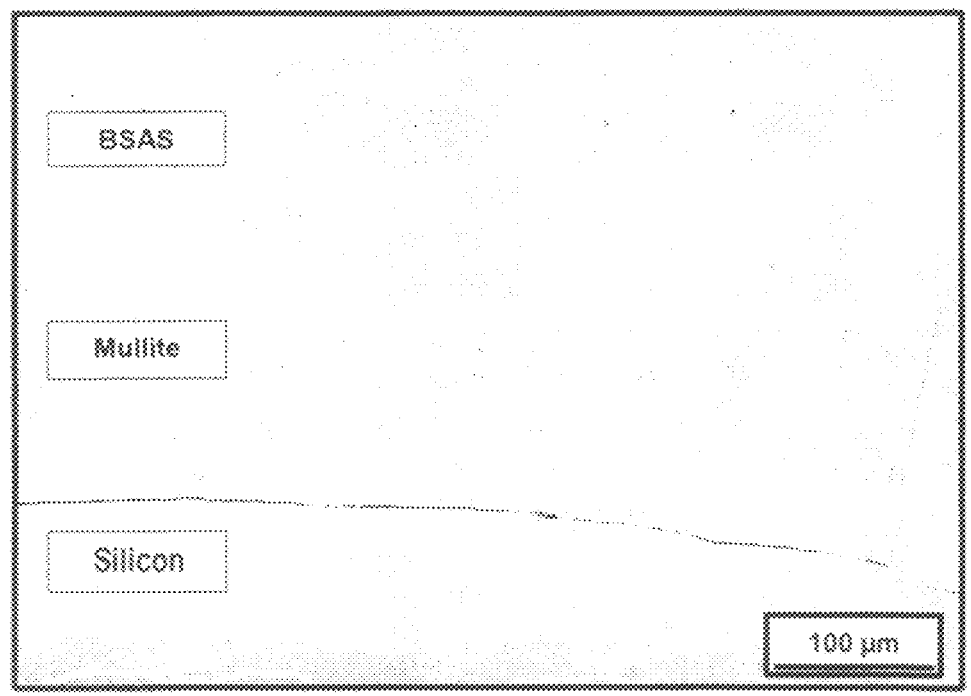

In contrast, cracking was observed in the Si bond sub-layer of the environmental barrier obtained in Example 2, as can be seen in FIG. 7.

Test 2

Substrates coated in environmental barriers of Example 1 were subjected respectively:

to a corrosion test by being exposed at 1400° C. to a stream of wet air (700 grams (g) of water per kilogram (kg) of air) at a speed of 5 centimeters per second (cm/s) for 600 hours (h); and a severe fatigue and corrosion test: traction stressing at 160 megapascals (MPa) at 1200° C. for 30 h followed by exposure at 1200° C. to a stream of wet air (700 g of water per kg of air) at a speed of 2 cm/s for 250 h.

Figure 8:
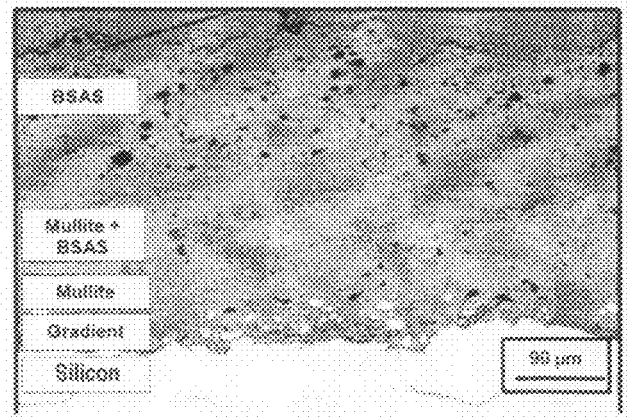
FIGS. 8 to 10 are scanning electron microscope views of sections of the environmental barrier of the invention after corrosion testing and fatigue testing.

FIG. 8 is a photograph of a section of environmental barrier after the first of those two tests. No degradation of the environmental barrier was observed.

Figure 9:
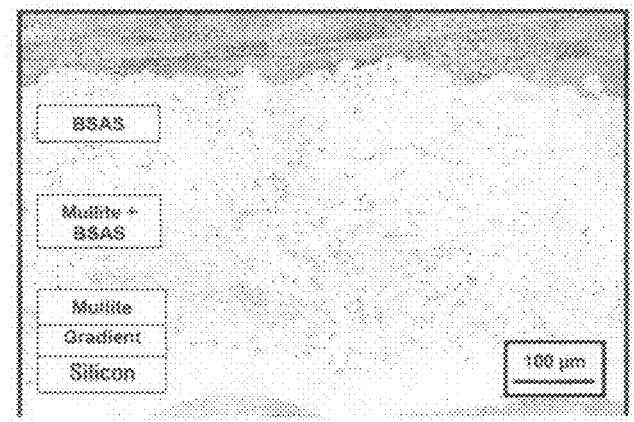
Figure 10:
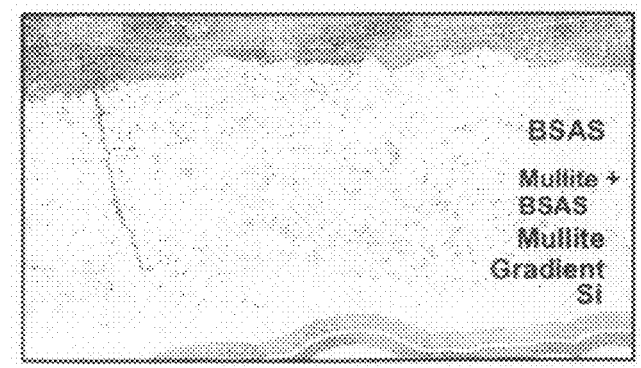

FIGS. 9 and 10 are photographs of sections of the environmental barrier after the second of those two tests, the photograph of FIG. 10 being selected by searching for the presence of a crack. It can be seen that the crack visible in FIG. 10 involves only part of the thickness of the environmental barrier, starting from its outer surface, the crack terminating in the mixed silicon/mullite layer. Thus, this mixed layer helps to dissipate cracking energy so as to prevent a crack reaching the thin layer of silicon formed on the surface of the substrate and thus running the risk of the environmental barrier loosing cohesion.

The invention claimed is:

1. A part comprising:
   a substrate of ceramic matrix composite material containing silicon; and
   an environmental barrier formed on the substrate and comprising:
     an outer anticorrosion protection layer containing a compound comprising an aluminosilicate of an alkali, element, an aluminosilicate of an alkaline-earth element, or an aluminosilicate of a rare-earth element, and
     a bond sub-layer containing silicon and formed on the substrate,
   wherein:
   the bond sub-layer is formed between the substrate and the anticorrosion protection layer,
   the composition of the bond sub-layer varying from silicon to mullite between an inner face beside the substrate and an outer face, with the silicon content decreasing and the mullite content increasing,
   the bond sub-layer beginning, beside its inner face, in a layer of silicon formed on the substrate and having a thickness of no more than 50 µm, and
   the bond sub-layer terminating, beside its outer face, in a layer of mullite having a thickness of no more than 50 µm.

2. The part according to claim 1, wherein the environmental barrier further comprises an outside thermal protection layer formed on the outer anticorrosion protection layer.

3. The part according to claim 1, wherein the environmental barrier comprises the anticorrosion protection layer formed by a compound comprising an aluminosilicate of an alkali, element, an aluminosilicate of an alkaline-earth element, or an aluminosilicate of a rare-earth element, and an underlying layer formed on the bond sub-layer and comprising an association of said compound together with mullite.

4. The part according to claim 3, wherein said underlying layer has a composition that varies between mullite at an inner face situated beside the bond sub-layer and substantially solely the compound forming the anticorrosion protection layer at an outer face situated beside said anticorrosion protection layer, with the mullite content decreasing progressively and the content of said compound increasing progressively.

5. The part according to claim 1, constituting a component of a hot portion of a gas turbine.

6. The part according to claim 5, constituting at least a portion of a wall of a gas turbine combustion chamber.

* * * * *